UNITED STATES PATENT OFFICE.

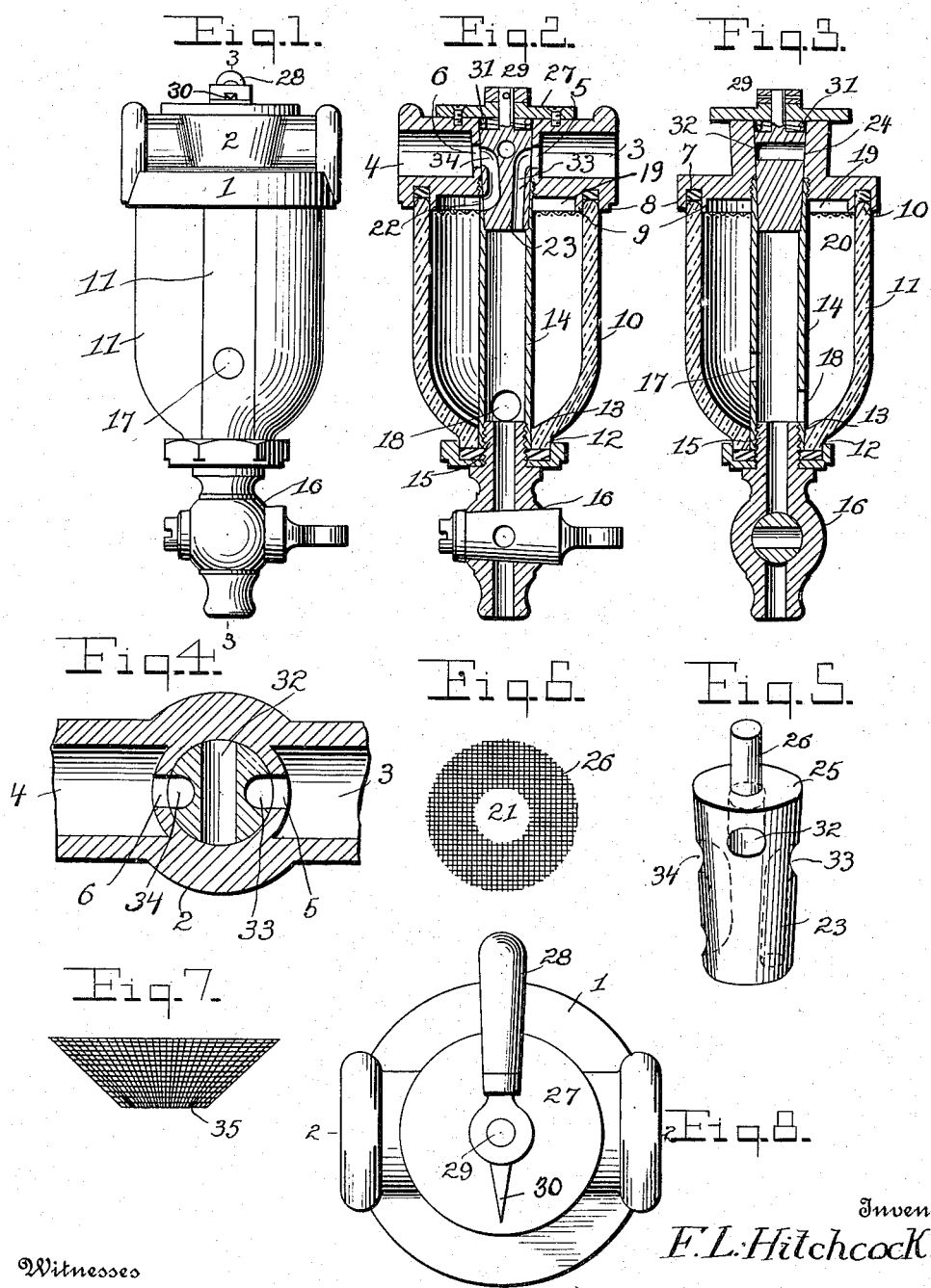

FORREST L. HITCHCOCK, OF INDIANAPOLIS, INDIANA, ASSIGNOR OF ONE-HALF TO
EVA R. TEMPLETON, OF INDIANAPOLIS, INDIANA.

GASOLENE-FILTER TRAP.

1,062,236.

Specification of Letters Patent.

Patented May 20, 1913.

Application filed August 19, 1912. Serial No. 715,883.

*To all whom it may concern:*

Be it known that I, FORREST L. HITCHCOCK, a citizen of the United States, residing at Indianapolis, in the county of Marion, State of Indiana, have invented certain new and useful Improvements in Gasolene-Filter Traps; and I do hereby declare the following to be a full, clear, and exact description of the invention, such as will enable others skilled in the art to which it appertains to make and use the same.

This invention relates to certain novel and useful improvements in a gasolene filter trap.

In carrying out my invention it is my purpose to provide a device of this character designed to be employed with gasolene supply pipes or with carbureters, and by means of which all sediment, water and other foreign matter may be separated or filtered from the gasolene prior to the vaporization of the latter.

It is also my purpose to provide a simple, compact and efficient filter trap by means of which such separation may be accomplished thoroughly and readily, and furthermore, the filter chamber is preferably constructed of transparent material so that the amount of foreign matter collected from the gasolene may be determined and removed from the chamber through a suitable stop cock carried by the latter.

In my invention, I also provide a suitable controlling valve by means of which the gasolene may be directed through the trap without entering the filter chamber, or may be turned into the filter chamber, or may be cut off entirely from the latter.

With the above recited objects and others of a similar nature in view, my invention consists in the construction, combination and arrangement of parts set forth in and falling within the scope of the appended claims.

In the accompanying drawings: Figure 1 is a view in side elevation of a trap embodying my invention. Fig. 2 is a vertical sectional view on the line 2—2 of Fig. 8. Fig. 3 is a vertical cross sectional view on the line 3—3 of Fig. 1. Fig. 4 is horizontal sectional view taken through the plug valve chamber and plug valve therein. Fig. 5 is a perspective view of the plug valve with the three channels or ports thereof indicated in dotted lines. Fig. 6 is a detail view of the circular screen disk shown in Figs. 2 and 3. Fig. 7 is a detail of a modified form of filtering screen. Fig. 8 is a top plan view showing the handle and indicator.

Referring now to the accompanying drawings in detail, the numeral 1 designates the head of the trap, which may be formed of suitable metal and in the present instance circular in contour, upon which head is mounted the valve chamber 2 having an inlet 3 and an outlet 4 communicating therewith, the bores of the inlet and outlet sections being preferably threaded for the reception of pipe ends. The ports 5 and 6 affording communication between the valve chamber and the inlet and outlet sections, respectively, are preferably elongated in a vertical direction for a purpose hereinafter described. The under side of the head is provided with a circular groove 7 formed by the external flange 8 and the internal flange 9, this groove being designed to seat the rim 10 of the filter chamber 11, the latter being of any suitable shape and dimensions, and is preferably formed of transparent material, such as glass. In the preferred form of the glass chamber shown in the drawings, the lower rounded reduced end is provided with a flange 12 surrounding the circular opening 13 in the chamber.

The numeral 14 indicates a tube depending preferably centrally from the bottom face of the head and communicating at its upper end with the valve chamber 2, said tube having an open lower end which projects through the opening in the lower end of the glass chamber. This lower open end of the tube is interiorly threaded for the reception of the threaded neck 15 of the pet-cock 16 by means of which this chamber may be drained. The lower portion of the tube lying within the glass chamber is provided with the apertures 17 and 18 by means of which the unfiltered gasolene flowing down the tube may escape into the chamber as will be hereinafter apparent. The circular depression or recess formed in the bottom of the head between the internal flange and the depending tube, and indicated by the numeral 19 is covered by a filtering disk 20 which is in the nature of finely woven wire cloth or other screen-like material, and has a central opening 21 so that it may be slipped over the tube and along the same to its position where it covers the depression or recess. The depending tube is provided with an opening or port 22 above the screen or immediately below the point where the tube joins the head so that as hereafter described, the gasolene may pass from the glass chamber through the screen and out of this port and through the valve to the outlet of the valve chamber.

I propose to control the flow of the gasolene passing through the inlet so that it may be passed directly from the inlet to the outlet without entering the filtering chamber, or may be turned into the filtering chamber, or may be cut off entirely at the inlet without passing the trap at all. This, I accomplish by means of the tapered three-way plug valve shown in detail in Fig. 5 and indicated as an entirety by the numeral 23. As will be seen by reference to Figs. 2 and 3, the interior wall of the valve chamber is tapered as at 24 to properly receive and seat the tapered plug, the top 25 of which, when the plug is seated, lies below the top of the chamber. The stem of the plug is shown at 26 and extends through the top cover or retaining plate 27 and is connected to the operating handle 28 as at 29, said handle having an indicator pointer 30 opposite the grasping end, so that when the handle is swung over the top plate 27, the direction of flow of the gasolene may be readily indicated. For instance, when the handle points to the indication reading "Direct" on the top plate, the flow is straight through from inlet to outlet, without the fluid entering the filter chamber, while the indicator points to "On," it shows that the plug is set for the gasolene to pass to the chamber and when the pointer is set at "Off," it shows that the flow is cut off entirely from the trap. In order to properly retain the plug seated in the chamber, I provide a spring 31 which is coiled about the stem 26, and one end of which bears against the under side of the top plate, while the other end seats on the top of the plug body. As will be seen by reference to Fig. 5, this plug body is formed with three distinct channels or ports. The transverse port 32 passes directly through the center of the plug near the top thereof, the channel 33 leads approximately vertically from the upper portion of the plug and opens out into the chamber at the bottom face of the plug and preferably near the periphery thereof, while the channel 34 is also disposed vertically and has both its inlet and outlet at the same side of the wall, or the side opposite from the inlet of the vertical channel 33. It will thus be seen that the plug is bored to provide one horizontal port and two vertical channels.

From the above description taken in connection with the accompanying drawings, the construction and operation of my improved filter trap will be readily understood. Assuming the trap to be assembled as shown in Fig. 1, if the handle be swung to turn the plug so that the indicator points to "Direct," the gasolene will flow through the transverse port 32 from the inlet to the outlet without entering the filter chamber. It will be seen that this transverse port is bored in the plug above the line of the upper openings of the vertical channels, but the elongated shape of the ports 5 and 6 admits of the inlet and outlet having communication with both the transverse port and the vertical channels. When the handle is swung to the indication "On," the flow is through the inlet, thence through the vertical channel 33 into the glass chamber. As the fluid rises in the chamber, it will pass through the screen and thence through the aperture in the top of the tube which now alines with the lower opening or inlet of the channel 34 and thence through said channel to the outlet of the valve chamber. When the handle is turned to the position marked "Off," the inlet to the valve chamber is closed by the solid wall of the plug and no fluid can enter the valve chamber.

In Fig. 7, I have shown a modified form of screen which may be employed in place of the screen disk, in this case the screen being in the nature of a conical body of screen mesh which is mounted in the same relative position in the trap. This screen is indicated by the numeral 35.

In use the trap may be supported and mounted on any suitable bracket or other attachment by means of which it may be sustained in proper working position.

It will be noted that the glass chamber may be readily removed when desired by simply unscrewing the pet-cock and drawing off the chamber. It will further be observed that the amount of sediment, water or other foreign matter filtered by the screen and which is collected in the chamber may be readily ascertained.

While I have herein shown and described one particular embodiment of my invention, I wish it to be understood that I do not limit myself to all the precise details of construction herein set forth, as modification and variation may be made without departing from the spirit of the invention or exceeding the scope of the appended claims.

What I claim is:

1. The combination with a head formed with a valve chamber and an inlet and an outlet leading from the valve chamber, there being elongated ports forming communication between the valve chamber and the inlet and the outlet, a filtering chamber carried by the head, a perforated tube extending from the valve chamber and provided with fluid openings, a drain cock connected with the end of the tube opposite the valve chamber and a three way valve within the valve chamber adapted when in one position to direct the flow of fluid from the inlet directly to the outlet, in a second position to direct the fluid into the tube whence it passes to the filtering chamber, and in a third position to cut off the flow of fluid to the inlet of the valve chamber.

2. The combination with a head, of a valve chamber carried thereby and having an inlet and an outlet, there being vertical elongated ports therein forming communication between the valve chamber and the inlet and the outlet, of a filter chamber, a filtering element in said chamber and a three way valve in the valve chamber having oppositely disposed vertical channels and a transverse channel located above the vertical channels, said valve being operated to control the flow of fluid to the valve chamber and to the filter chamber.

3. The combination with a head, of a valve chamber carried thereby and having an inlet and an outlet passage, said head having a groove formed in the underside thereof, of a filter chamber seated at one end in the groove and open at its opposite end, a tube extending from the valve chamber through the filtering chamber and projecting through the open end of the latter, a drain cock connected to the projecting end of the tube, a filtering element within the chamber located below and covering a recess in the underside of the head, and a valve in the valve chamber controlling the flow of fluid therethrough.

4. The combination with a head, of a valve chamber carried thereby and provided with an inlet and an outlet, of a filter chamber mounted below the head, a tube depending from the head into the filter chamber and communicating with the valve chamber, said tube having an outlet opening in the bottom portion, the end of said tube being open and projected through an opening in the bottom of the filter chamber, a drain cock connected with the end of the tube, a filtering screen at the upper portion of the tube and below an opening formed in said upper portion, and a three-way plug valve in the valve chamber having a transverse port and two oppositely disposed vertical channels, said plug valve being operated to control the flow of fluid to the valve chamber and the filter chamber.

In testimony whereof, I affix my signature, in presence of two witnesses.

FORREST L. HITCHCOCK.

Witnesses:
 HATTIE GYER,
 MARY B. HOSMAN.